US012774557B2

(12) United States Patent
Wallmo et al.

(10) Patent No.: US 12,774,557 B2
(45) Date of Patent: Oct. 27, 2026

(54) METHOD AND SYSTEM FOR LIGNIN PRODUCTION

(71) Applicant: VALMET AB, Sundsvall (SE)

(72) Inventors: Henrik Wallmo, Alingsås (SE); Anders Littorin, Hisings-Kärra (SE)

(73) Assignee: VALMET AB, Sundsvall (SE)

( * ) Notice: Subject to any disclaimer, the term of this patent is extended or adjusted under 35 U.S.C. 154(b) by 216 days.

(21) Appl. No.: 18/570,556

(22) PCT Filed: Jun. 29, 2022

(86) PCT No.: PCT/SE2022/050652

§ 371 (c)(1),
(2) Date: Dec. 14, 2023

(87) PCT Pub. No.: WO2023/277776

PCT Pub. Date: Jan. 5, 2023

(65) Prior Publication Data

US 2024/0287738 A1 Aug. 29, 2024

(30) Foreign Application Priority Data

Jun. 30, 2021 (SE) .................................. 2150840-3

(51) Int. Cl.
*D21C 11/00* (2006.01)
*C07G 1/00* (2011.01)
*C08H 7/00* (2011.01)

(52) U.S. Cl.
CPC ........... *D21C 11/0007* (2013.01); *C07G 1/00* (2013.01); *C08H 6/00* (2013.01)

(58) Field of Classification Search
CPC ...... D21C 11/0007; D21C 11/04; C07G 1/00; C08H 6/00
See application file for complete search history.

(56) References Cited

U.S. PATENT DOCUMENTS 9,175,438 B2 * 11/2015 Wimby .................... C08H 8/00
2017/0355723 A1 12/2017 Tikka

FOREIGN PATENT DOCUMENTS

CN 104963231 A * 10/2015 .............. C08H 6/00
EP 2 723 939 A1 4/2014

(Continued)

OTHER PUBLICATIONS

English translation of the description of CN104963231A retrieved from Espacenet (Year: 2025).*

(Continued)

*Primary Examiner* — Abbas Rashid
*Assistant Examiner* — Elisa H Vera
(74) *Attorney, Agent, or Firm* — Foley & Lardner LLP

(57) ABSTRACT

The invention relates to separation of lignin from an aqueous slurry containing lignocellulosic biomass material, such as black liquor, comprising the steps of providing an aqueous slurry having an initial pH level to a first precipitation phase, where the first precipitation phase is performed during a first time duration including adding a first acidifier. Thereby, a decrease in the pH value of the aqueous slurry from the initial pH level to a first pH level above 11 is created. Thereafter, processed aqueous slurry is fed from the first precipitation phase to a second precipitation phase. The second precipitation phase is performed during a second time duration. The second precipitation phase includes adding of a second acidifier, wherein a decrease in the first pH value from said first pH level to a second pH level above 9 is created.

16 Claims, 5 Drawing Sheets

(56) References Cited

FOREIGN PATENT DOCUMENTS

| | | | |
|---|---|---|---|
| EP | 2 776 621 | A1 | 9/2014 |
| EP | 2 776 621 | B1 | 9/2014 |
| WO | WO-2010/143997 | A1 | 12/2010 |
| WO | WO-2011/037967 | A2 | 3/2011 |
| WO | WO-2012/177198 | A1 | 12/2012 |
| WO | WO-2013/002687 | A1 | 1/2013 |
| WO | WO-2013/070130 | A1 | 5/2013 |
| WO | WO-2013/137790 | A1 | 9/2013 |
| WO | WO-2014/116150 | A1 | 7/2014 |
| WO | WO-2018/146341 | A1 | 8/2018 |
| WO | WO-2019/191828 | A1 | 10/2019 |
| WO | WO-2020/243805 | A1 | 12/2020 |

OTHER PUBLICATIONS

International Search Report and Written Opinion of the International Searching Authority issued in the corresponding International Patent Application No. PCT/SE2022/050652, dated Oct. 5, 2022.

Office Action issued in connection with Swedish Appl. No. 2150840-3 dated Jun. 2, 2023.

Search Report issued in connection with Swedish Appl. No. 2150840-3 dated Feb. 23, 2022.

* cited by examiner

METHOD AND SYSTEM FOR LIGNIN PRODUCTION

FIELD OF INVENTION

The present invention relates to a method and a system for lignin separation from an aqueous slurry containing lignocellulosic biomass material, such as black liquor, using precipitation processes. The present invention also relates to a computer structure or computer-readable medium for controlling the process.

BACKGROUND OF THE INVENTION

An efficient process for lignin separation from black liquor is Lignoboost™, in which the basic concept includes a two-stage acidic wash process. The Lignoboost™ process produces a lignin product which if used as fuel is classified as a "green" fuel being based on recovered fuel. The idea with classification of "green" fuels is based upon the concept not to increase the carbon dioxide footprint, i.e. the emissions, by burning fossil fuels.

An important aspect of the process is that the required charge of chemicals for the acidification may be high. If this is the case, the cost of fresh chemicals is a large part of the operational costs and commercial viability of the process will thereby be lower. These problems could be reduced, if the process is optimized for minimum requirement of charges of fresh chemicals, making the lignin product commercially sound. Acidifiers in the form of mill generated waste flows are thus preferable as it may solve waste disposal problems and lessen environmental impact. As the precipitation of lignin requires acidification of alkaline black liquor flows, much of the total amount of acidifier is used to decrease the pH level down to the point where lignin starts to precipitate. This first phase reaching this pH level typically reduce the pH level from about pH 13 in the black liquor down to a pH of about 11.5, and normally do not involve any nucleation of lignin particles. The amount of acidifier needed is nevertheless relatively high for this first phase as the pH follows a logarithmic curve, and any following additional lowering a pH from 11.5 requires far less acidifier for the same order of lowered absolute pH value.

As the chemical constitution of the black liquor may change during operation, typically due to changes in the pulping process as of changes in wood material used or cooking conditions, the first precipitation phase for precipitating lignin particles from the black liquor may need adaptation to the present conditions. As differing requirements apply for the first precipitation phase, where mainly lowering of pH is the objective, and the second precipitation phase, where lignin starts to precipitate, it will be difficult to design a system that meets both these requirements.

In EP 2723939, a two-stage precipitation process is described where lignin is precipitated from black liquor. In the first phase, a first acidifier charge is added to the black liquor in order to decrease the pH to a pH value at least 1 pH unit below the initial to precipitate less than 10% of the total lignin. The first phase is followed by a second phase wherein a second acidifier is added to decrease the pH value to a third level, at least 0.1 pH units below that of the second pH level but still on the alkaline side, >pH 7, where lignin is precipitated preferably as growth of nucleus particles formed in the first phase so at least 30% of the total lignin content is precipitated in total.

In EP 2776621, a two-stage precipitation process is described where lignin is precipitated from black liquor but with the addition of a passive storage phase between the two precipitation phases. In the first precipitation phase, a first acidifier charge is added to the black liquor in order to decrease the pH to a pH value at least 1 pH unit below the initial to precipitate less than 10% of the total lignin. Thereafter, a storage phase takes place, where the pH level is kept at or below the second pH level (the pH level for the first phase) for at least 25 minutes. The storage phase is followed by a second precipitation phase wherein a second acidifier is added to decrease the pH value to a third level, at least 0.1 pH units below that of the second pH level but still on the alkaline side, >pH 7.

However, there is still room for improved precipitation processes where lignin is precipitated from preferably black liquor.

SUMMARY OF THE INVENTION

An object of the present invention is to provide improved methods and systems for lignin separation from an aqueous slurry containing lignocellulosic biomass material, preferably, from black liquor, using precipitation processes.

Another object of the present invention is to increase filter capacity and efficiency in lignin separation from an aqueous slurry containing lignocellulosic biomass material such as black liquor, using precipitation processes.

The present invention is based upon the surprising insight that the efficiency of the precipitation process can be significantly improved by dividing the precipitation into at least two distinctive phases, including a first precipitation phase and a second prolonged precipitation phase, or combined precipitation and retention phase, each phase having its own supply of acidifier specially adapted for respective phase. In preferred embodiments, the addition of acidifier during the second prolonged precipitation phase is performed at defined periods (for example in a first period at the start of the phase), or at regular intervals during the phase or continuously during the phase.

According to an aspect of the present invention, there is provided a method for separation of lignin from an aqueous slurry containing lignocellulosic biomass material, such as black liquor, comprising the steps of providing an aqueous slurry containing lignocellulosic biomass material having an initial pH level to a first precipitation phase, where the first precipitation phase is performed in a first precipitation vessel during a first reaction time including adding a first acidifier. Thereby, a decrease in the pH value of the aqueous slurry from the initial pH level to a first pH level above 11 is created. Thereafter, processed aqueous slurry is fed from the first precipitation phase to a second precipitation phase. The second precipitation phase is performed in a second precipitation vessel during a second time duration of at least 20 minutes. The second precipitation phase includes adding of a second acidifier, wherein a decrease in the first pH value from said first pH level to a second pH level above 9 is created.

According to a second aspect of the present invention, there is provided a computer-readable medium having stored therein computer-readable instructions for a processor, wherein the instructions when read and implemented by the processor cause the processor to control a first precipitation phase in a first precipitation vessel on an aqueous slurry containing lignocellulosic biomass material, such as black liquor, having an initial pH level during a predetermined first time duration, wherein at least one injector is controlled to add a first acidifier, wherein a decrease in the pH value of the aqueous slurry from the initial pH level to a first pH level is created, wherein the first pH level is above 11. Furthermore, the processor controls a second precipitation phase in a second precipitation vessel on the aqueous slurry containing lignocellulosic biomass material during a predetermined second time duration of at least 20 minutes, wherein at least one injector is controlled to add a second acidifier, wherein a decrease in the pH value from said first pH level to a second pH level above 9 is created. The computer readable-medium may be configured to execute one or more of the steps of the method according to the invention and/or to control one or more parts of the system according to the invention.

According to a further aspect of the present invention, there is provided a system for separation of lignin from an aqueous slurry containing lignocellulosic biomass material, such as black liquor, comprising a first precipitation vessel configured to receive an aqueous slurry having an initial PH level and perform a first precipitation phase during a predetermined first time duration. At least one injector is configured to add a first acidifier (for use in the first precipitation phase) to create a decrease in the pH value of the aqueous slurry from said initial pH level to a first pH level in the first precipitation vessel, wherein the first pH level is above 11. A second precipitation vessel is configured to receive processed aqueous slurry or acidified slurry from the first precipitation phase and perform a second precipitation phase during a second predetermined time duration of at least 20 minutes. At least one injector is configured to add a second acidifier (for use in the second precipitation phase) to create a decrease in the first pH value from the first pH level to a second pH level in the second precipitation vessel, wherein the second pH level is above 9.

An injector configured to add an acidifier in a precipitation phase may be arranged in or before the precipitation vessel wherein the corresponding precipitation phase is performed. An injector arranged before the precipitation vessel is configured to add an acidifier to the aqueous slurry before it enters the precipitation vessel. More than one injector may be arranged to add one or more acidifiers in a precipitation phase, and these injectors may be arranged within and/or before the precipitation vessel.

In embodiments of the present invention more than two precipitation phases may be conducted. For example, at least one pre-phase of precipitation may be carried out on the aqueous slurry, for example, black liquor, to achieve an initial decrease of the pH level and precipitation of the received lignin content before or up-stream the first precipitation phase. In embodiments of the present invention, the pre-phase or pre-process is performed before or up-stream the first precipitation phase, where the acidic slurry is precipitated to achieve a first and moderate decrease in pH level, for example, one unit, and a small amount of the original lignin content is precipitated as nucleus particles, for example, a few percentages, such as below 5% or below 10%. Furthermore, additional phases may be performed after or down-stream the second precipitation phase, thereby achieving a step-wise decrease in pH level and increase in the amount of the original lignin content being precipitated as nucleus particles.

Thus, it has been found that significantly improved efficiency and productivity in the filtering stage of a lignin separation process can be achieved by applying a prolonged second precipitation phase where an acidifier, for example, gases rich in carbon dioxide, is added. During trials it has been shown that a multiple precipitation could be of interest and significantly improve the filtration properties of the precipitated aqueous slurry. In the present invention, CO2 gas or other acidifier agent, is injected in the first precipitation phase, but the precipitation is stopped at a higher pH level compared to prior art systems. The pH level in the first precipitation phase is stopped at a pH above 11, suitably between 11-12.

The first precipitation phase may be performed at atmospheric pressure or above atmospheric pressure. In embodiments, the first precipitation phase may be performed at a high pressure, (e.g. using at least one injection nozzle injecting gas(es) at a pressure of, for example, higher than 5 bar, for example, around 10 bar). However, in embodiments, the pressure may be around 2 bar (over pressure) or higher, for example, around 3 bars, or around 4 bars or around 5 bars. A higher pressure facilitates precipitation.

The second precipitation phase may be performed at atmospheric pressure or above atmospheric pressure. In embodiments, the second precipitation phase may be performed at a high pressure, (e.g. using at least one injection nozzle injecting gas(es) at a pressure of, for example, higher than 5 bar, for example, around 10 bar). However, in embodiments, the pressure may be around 2 bar (over pressure) or higher, for example, around 3 bars, or around 4 bars or around 5 bars. A higher pressure facilitates precipitation.

In some embodiments, the first precipitation phase and the second precipitation phase are carried out at the same pressure.

In some embodiments, the first precipitation phase is carried out at a higher pressure than the second precipitation phase.

In some embodiments, the first precipitation phase is carried out at a lower pressure than the second precipitation phase.

In some embodiments, the first and/or second precipitation phase is carried out at low pressure, preferably at atmospheric pressure.

In embodiments of the present invention, at least 10% of the original lignin content is precipitated as nucleus particles in the first precipitation phase.

In embodiments, the first precipitation phase is approximatively short, for example, 10 to 60 seconds, or 10 to 40 seconds, or 10 to 30 seconds. The precipitated lignin in the first precipitation phase is more than 10% of the total lignin content of the aqueous slurry containing biomass material, for example, black liquor.

After the first precipitation phase, the pressure is released and the precipitated slurry is led to a second prolonged precipitation phase, for example, a tank where the second precipitation phase is carried out. In preferred embodiments of the present invention, the duration of the prolonged second precipitation phase is around 20-60 minutes. In this prolonged precipitation phase, CO2 gas or other acidifying agent is introduced, and in embodiments this is performed continuously or intermittently at intervals using, for example, a sparger or an impeller, and the pH level decreases, for example from 11-12 to above 9, for example approximately 10, or 10-11, or 9-11, or 9-10. In this second prolonged precipitation phase a second larger fraction of lignin is additionally precipitated.

The present invention can be used in continuous processes as well as in batch processes.

The inventors have found that in this new concept of multiple precipitation phases, where a second precipitation phase is prolonged (e.g. a duration of between 20-60 minutes or 30-80 minutes) and an acidifier is added (in embodiments this is performed continuously or intermittently at intervals, or at certain occasions during the reaction time), the filtration resistance can be significantly reduced and thereby significantly improve the filtration time. In trials, the filtration resistance has been reduced with 11-16 times and the filtration time was 3 to 4 times faster. This, in turn, entails an improved and increased capacity of the pressure filter. The new inventive concept shows a considerable increase of particle sizes, in particular, in the larger fractions.

According to embodiments of the present invention, a second precipitation phase during a reaction time of at least 20 minutes, and preferably during a time duration of 20-60 minutes, and preferably during a time duration of 30-50 minutes, and more preferably during a time duration of 35-45 minutes.

According to embodiments of the present invention, the first precipitation phase is performed during a reaction time of at least 10 seconds, and preferably during 10-80 seconds, and preferably during 10-30 seconds.

In embodiments of the present invention, at least 10% of the original lignin content is precipitated as nucleus particles in the first precipitation phase.

In embodiments of the present invention, at least 15% of the original lignin content is precipitated as nucleus particles in the first precipitation phase.

In embodiments of the present invention, at least 20% of the original lignin content is precipitated as nucleus particles in the first precipitation phase.

According to embodiments of the present invention, the first pH level is above 11 and the second pH level is above 10. In yet other embodiments, the first pH level is between 11-12 and/or the second pH level is above 9, for example, between 9-11.

In further embodiments of the present invention, a second acidifier is continuously added during stirring of the processed aqueous slurry.

According to embodiments of the present invention, at least one of the first or second acidifier comprises acidifying gas.

In embodiments of the present invention, at least one further precipitation phase, including adding a third acidifier, is performed down-stream the second precipitation phase.

In this context, a precipitation vessel is a structure suitable for receiving an aqueous slurry for the purpose of precipitating lignin. A vessel may, for example, be a pipe or a tank or a portion of a pipe or a tank.

In a continuous process, the first vessel and second vessel are separate vessels or separate portions of a larger vessel.

In a batch process, the first and second vessel may be separate vessels or separate portions of a larger vessel. However, the first and second vessel may also be the same vessel.

The disclosure may be understood more readily by reference to the following detailed description of the various features of the disclosure and examples included therein.

BRIEF DESCRIPTION OF THE DRAWINGS

Further objects and advantages of the invention will become apparent from the following description of an apparatus for carrying out the method of the invention shown by way of example in the accompanying figures which forms a part of this specification and in which.

BRIEF DESCRIPTION OF THE INVENTION

Figure 1:
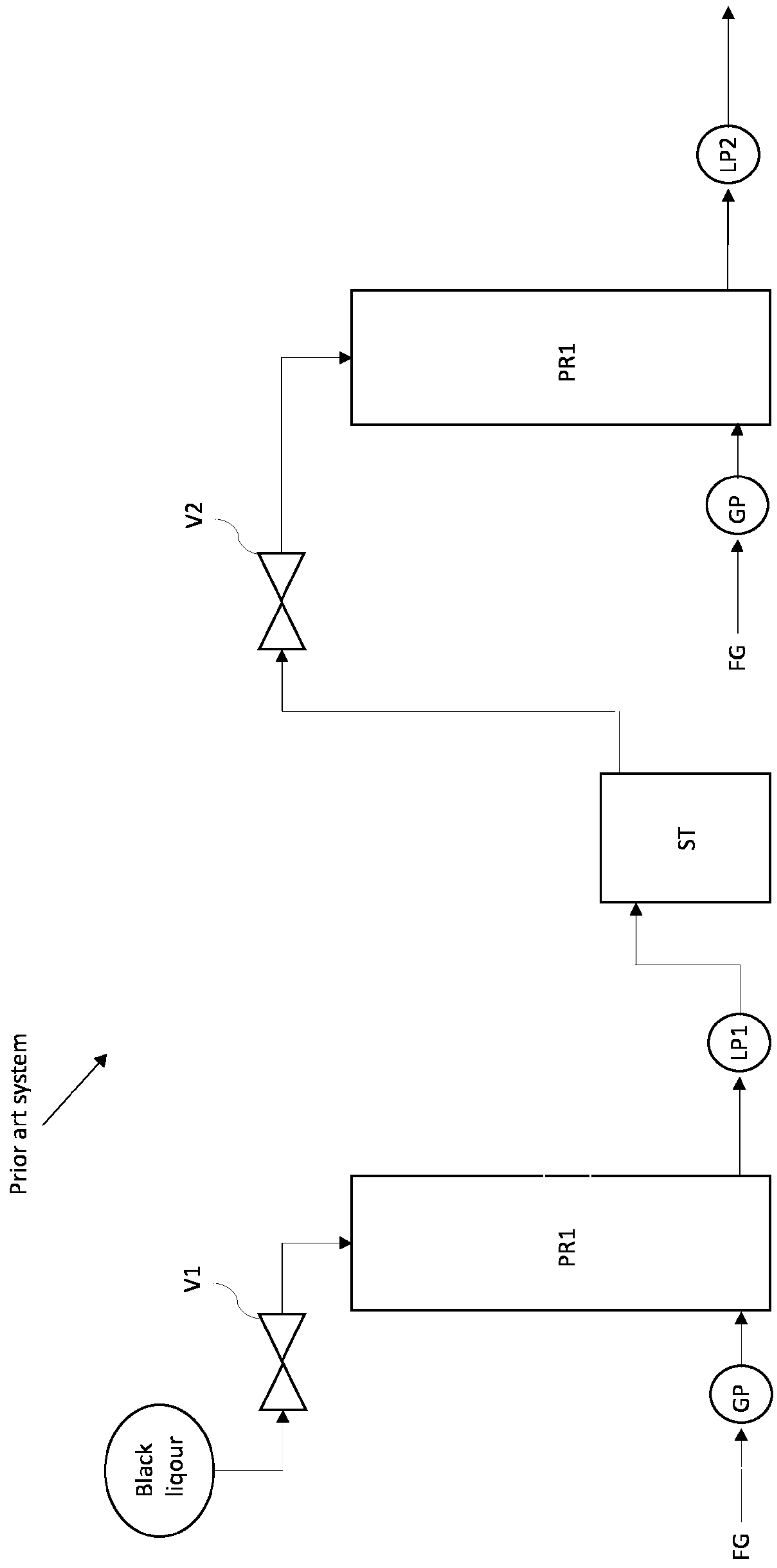
FIG. 1 schematically shows a prior art lignin separation process.

The present invention is generally based on the LignoBoost™ process, which is basically described in, for example, WO 2006/031175. In the basic concept, the separation of lignin from an aqueous slurry containing lignocellulosic biomass material, such as black liquor, comprises the following in sequence:

- Precipitation of lignin by acidification of the black liquor by adding a first acid or mixture of acids, in any suitable precipitation reactor;
- Dewatering while forming a first filter cake with high content of lignin, which dewatering is made in any suitable filter press. A first filtrate is drain from the lignin suspension in order to reduce the amount of liquid in the filter cake, a gas may be blown through the lignin cake in order to displace any residual black liquor;
- Suspending the first lignin cake in a second acidification stage using a second acid or mixture of acids, which suspension is made in any suitable suspension tank, in order to obtain a second lignin suspension,
- Dewatering and washing to form a second filter-/lignin cake with high content of lignin. The dewatering is made in any suitable filter press, which may drain a second filtrate from the lignin suspension, and at least a portion of this second filtrate may be re-circulated back to the suspension stage. Washing of the second filter cake is made in any suitable wash apparatus, adding a wash liquid to the washing stage.

In order to obtain a purified lignin product having low residual levels of metal, especially sodium, while consuming less acidifiers and hence produce less volume of acidic waste flow volumes, and at low costs for acidifiers, some process conditions have been found best suitable. It has been found that carbon dioxide is the preferred first acidifier as carbon dioxide may be found in waste gases in a pulp mill. Hence, using carbon dioxide in waste gases solves both waste gas problems as well as decreases need to use external chemicals. The conditions in the precipitation stage are kept at an alkaline level. This results in that bulk volume of black liquor treated in the precipitation stage is kept in the filtrate and may thus be re-introduced in the recovery operations without inflicting any dramatic pH changes in the recovery process. The relatively small volume share of the lignin cake is the only volume needing further acidification for leaching of metals from the lignin, which means that the volumes of the second acidifier is low in relation to the black liquor volumes. In order to obtain sufficient leaching of metals the leaching process has been kept at operating conditions at pH 2-4 at 50-60° C. A lignin product could be produced at these conditions with very low residual content of sodium, thus suitable as fuel in for example combustion plants.

It is intended throughout the present description that the expression "separation stage or phase" embraces any means of separation. Preferably the separation is performed by using centrifugation, a filter press apparatus, a band filter, a rotary filter, such as a drum filter, or a sedimentation tank, or similar equipment, most preferred a filter press apparatus is used.

It is intended throughout the present description that the expression "black liquor" embraces spent cooking liquor from a digester, having most of the lignin from the cellulose material dissolved in the "black liquor". The black liquor may also have a large content of organic and inorganic material but may also have passed through separation processes for extracting turpentine or other specific constituents, while keeping the bulk volume of dissolved lignin unaltered. It is also understood that the black liquor may be substituted with another aqueous slurry containing lignocellulosic biomass material.

With reference first to FIG. 1, a typical or prior art precipitation system and its process conditions will be described. The described system is adapted for using black liquor from a kraft pulping process.

In this system, two precipitation vessels, for example carbonizing towers or vessels, PR1 and PR2, are connected in series with a storage vessel, ST, arranged in-between.

A typical size of the tower PR1 and PR2 is a height of 8-10 meters and a square section having dimensions of 1.4×1.4 meters for the first tower PR1 and 1.0×1.0 meter for the second tower PR2.

The black liquor $BL_{IN}$ is fed to the top of the first tower PR1 via a valve V1 and flows downwards to a liquid pump LP1. The precipitation towers PR1 and PR2 are preferably of differing design and to interior flow paths. The towers could be of simple elongated vertical design with a square section. The first precipitation tower PR1 fed with black liquor and added acidifying gas may contain a random packing of filling bodies, preferably of a type like Rachig-rings or other shapes or irregular filling bodies, the filling bodies preferably having dimensions of 5 centimeter or less.

The filling bodies are selected and installed in the tower in order to achieve that at least a part of the flow part of the first acidifying gas led through the first precipitation phase has a random flow path constantly changing flow direction with no straight flow path longer than 5 centimeters, preferably less than 1 centimeter, said flow path created by random packing and filling bodies in the flow path.

Flue gases FG (for example lime kiln flue gases), preferably rich in carbon dioxide may be added to the bottom of the first tower PR1 via a flue gas pump GP, and any residual gases RG may be vented to the atmosphere. A large part of the carbon dioxide content in the flue gases is dissolved in the first tower PR1. The pH level of the black liquor is also lowered as a consequence. In this prior art system, a first small fraction of lignin is precipitated in this first phase, typically a few percent, e.g. 3-4% of the total lignin content.

At the first precipitation tower PR1, the acidified black liquor is pumped to a storage vessel ST, where the acidified black liquor is allowed to mature for at least 25 minutes.

The second precipitation tower PR2 fed with acidified black liquor from the storage tower ST is adapted for avoiding blockage from any precipitated lignin particles. Lamellas could be installed to slow down an ascending motion of gas through the tower and thus increase contact time between gas and liquid, wherein the dissolving of carbon dioxide can be increased. The lamellas are inclined with an inclination selected to avoid accumulation of precipitate, i.e. to facilitate the downward motion of the precipitate through the tower.

The inclined lamellas are adapted to enable that at least a part of the flow path of the black liquor from the first precipitation phase led through the second precipitation phase has an open flow path allowing a straight flow path longer than 5 centimeters, with flow restrictions allowing precipitated lignin to move with the flow of the black liquor with a flow deflection of the precipitated lignin being less than 80 degrees in relation to the general flow direction of the black liquor through the second precipitation phase, hence allowing any precipitated lignin particles to flow with at least one flow vector being parallel to the general flow.

Thus, after the storage tower ST, the matured black liquor is fed to the top of the second tower PR2. In this second tower PR2, flue gases containing carbon dioxide are added and the pH level is further lowered. A second larger fraction of the lignin is additionally precipitated in the second tower PR2. Flue gases FG, for example lime kiln flue gases, are added to the bottom of the second tower PR2 via a flue gas pump GP, any residual gases EG may be sent further for combustion in a boiler. Normally, a large part of the carbon dioxide content in the flue gases dissolved in the second tower PR2 as the pH is further lowered.

Figure 2:
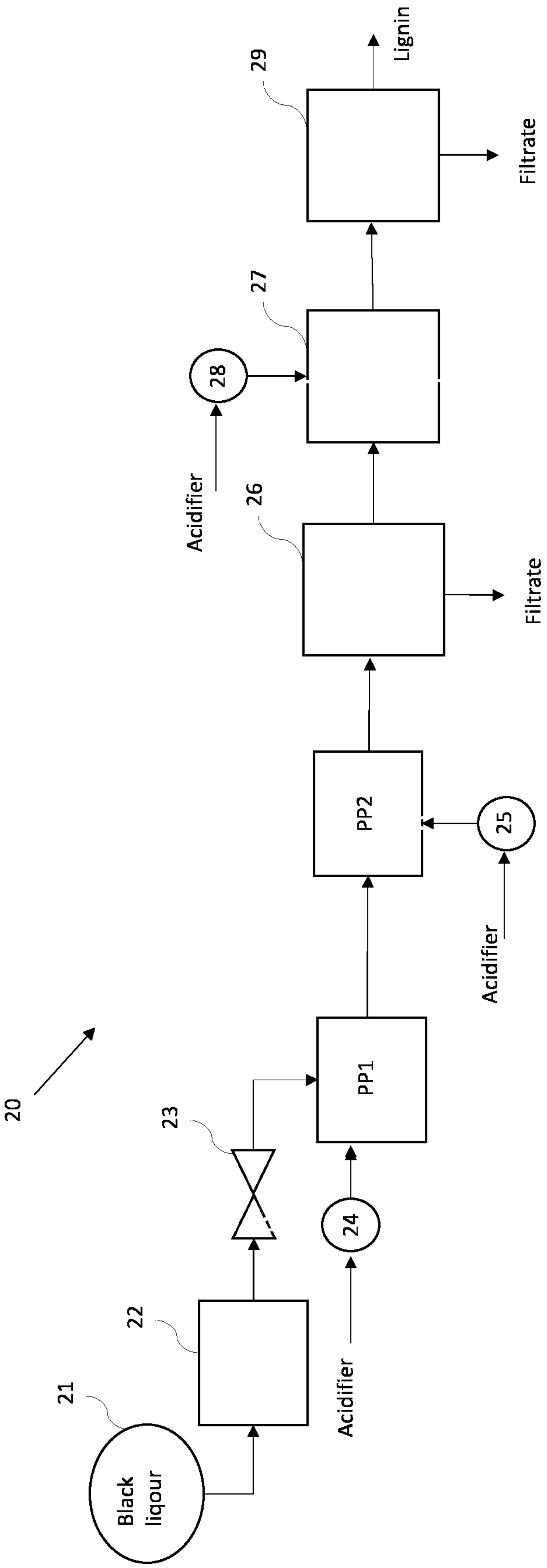
FIG. 2 schematically shows a basic and general lignin separation process in accordance with the present invention.
Figure 3:
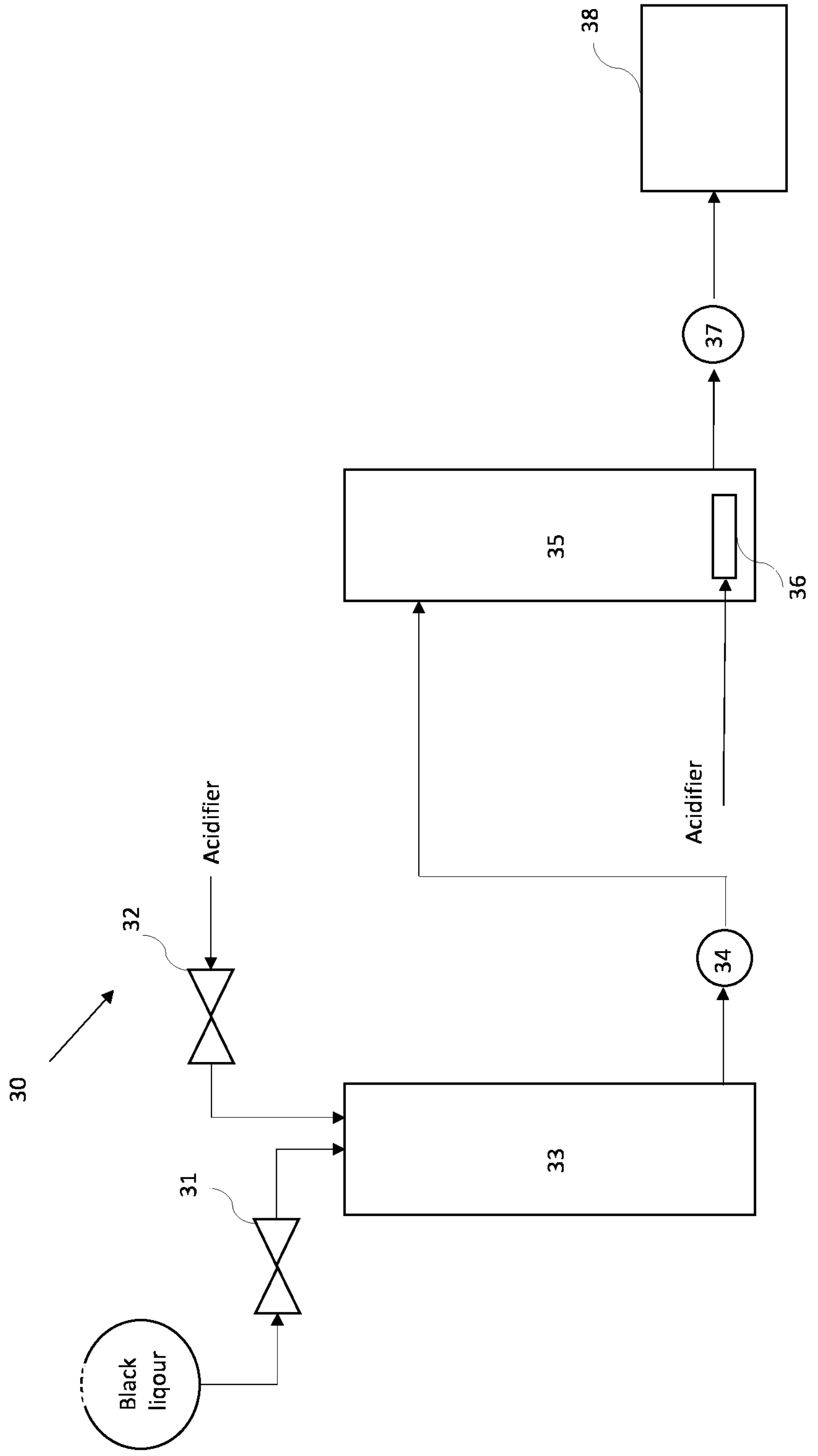
FIG. 3 schematically shows a lignin separation process in accordance with embodiments of the present invention.

Turning now to FIG. 2, a general precipitation system 20 according to the present invention, and its process conditions will be described. The described system is adapted for using an aqueous slurry containing lignocellulosic biomass material, preferably black liquor, from a kraft pulping process. In this system, two precipitation phases PP1 and PP2 are provided in series. In embodiments, for example, two precipitation vessels, for example, carbonizing towers, vessels, tanks, pipes, or conduits, 33 and 35, are connected in series as shown in FIG. 3. However, in embodiments of the present invention more than two precipitation phases may be conducted. For example, pre-step or pre-process is performed before or up-stream the first precipitation phase can be performed, where the received black liquor is precipitated to achieve a first and moderate decrease in pH level and a small amount of the original lignin content is precipitated as nucleus particles, for example, a few percentages, such as below 5% or below 10%. Furthermore, additional phases may be performed after or down-stream the second precipitation phase, thereby achieving a step-wise decrease in pH level and increase in the amount of the original lignin content being precipitated as nucleus particles.

In a first general embodiment of the present invention, the aqueous slurry having an initial pH level, for example, more than 12 and an initial temperature, for example, between 40-85 degrees is fed 21 to a black liquor tank 22, and thereafter further to a first precipitation phase, PP1, using, for example, pumps 23, and in embodiments via a heat exchanger (not shown). Preferably, black liquor is used.

The first precipitation phase PP1 is preferably performed during a predetermined first time duration, or reaction time, and at a first pressure including adding 24 a first acidifier. The first precipitation phase is preferably performed during a reaction time of at least 10 seconds, and preferably during 10-80 seconds, and preferably during 10-30 seconds.

In embodiments, the first acidifier is added using injection nozzles or valves 24 to achieve a high first pressure in the first precipitation phase, for example, a pressure more than 5 bars. In other embodiments, the first precipitation phase may be performed at below 5 bars, for example at atmospheric pressure. The first acidifier is preferably an acidifying gas such as $CO_2$. In the first precipitation phase, a decrease in the pH value of the black liquor from the initial pH level to a first pH level is created. For example, the pH of the black liquor is around 13 or 13.5 and the pH is lowered to around 11-12 in the first precipitation phase. In embodiments of the present invention, at least 10% of the original lignin content is precipitated as nucleus particles.

Thereafter, the acidic slurry or processed black liquor is fed from the first precipitation phase PP1 to a second precipitation phase PP2, which is performed during a second predetermined time duration, or reaction time. The second precipitation phase may be performed at a second pressure being lower than the first pressure. In other embodiments, the second pressure may be the same as or higher than the first pressure. A second acidifier, preferably an acidifying gas such as CO2 is continuously added using at least one injector 25, wherein a decrease in the first pH value from the first pH level to a second PH level is created. The second pH may be between 9-11, for example around 10. In preferred embodiments, the second acidifier is added during continuous stirring of the black liquor slurry.

In embodiments of the present invention, the second precipitation phase PP2 is performed during a reaction time of at least 20 minutes, and preferably during a reaction time of 20-60 minutes, and preferably during a reaction time of 30-50 minutes, and more preferably during a reaction time of 35-45 minutes. The second precipitation phase PP2 may be performed at atmospheric pressure. Thereafter, the processed black liquor slurry is fed to a separation or filtering stage 26, which may include a filter feed tank and a filter.

The filtering stage 26 may include dewatering made in a filter press, which may drain a filtrate from the lignin suspension and a lignin cake may be produced having a pH level in the range from neutral to alkaline, for example, above 7, or between 7-12.

Thereafter, an acidifying stage 27 is provided where an acidifier is added 28, for example, $H_2SO_4$, to thereby form an acidic slurry and establishing a low pH value, for example, in the range of 1-3. Preferably, a reaction temperature of the acidic slurry is established, for example, in the range of 65-90 degrees, or 70-85 degrees, or 75-88 degrees, or 78-85 degrees, or 83-87 degrees, or around 85 degrees, and the acidic slurry is maintained at the reaction temperature during a reaction time for, for example, 20-60 minutes, or 30-50 minutes, or 35-45 minutes, or around 40 minutes. This is followed by a second separation phase 29 in an acidic filter in which treated lignin content is separated from the acidic slurry.

With reference now to FIG. 3, another precipitation system 30 according to the present invention, and its process conditions will be described. The described system is adapted for using black liquor from a kraft pulping process. In this system, two precipitation phases 33 and 35 are arranged in series, for example, two precipitation vessels, for example, carbonizing towers, vessels, tanks, pipes, or conduits, wherein two precipitation phases can be performed in series. However, in accordance with the present invention, multiple precipitation phases can be applied. For example, a pre-step can be arranged before or up-stream the first precipitation phase, and/or one or more third and more steps can be arranged after or down-stream the second precipitation phase. Thus, in embodiments of the present invention, a pre-step or pre-process is performed before or up-stream the first precipitation phase, where the received black liquor is precipitated to achieve a first and moderate decrease in pH level and a small amount of the original lignin content is precipitated as nucleus particles, for example, a few percentage, such as below 5% or below 10%.

In a first general embodiment of the present invention, an aqueous slurry containing lignocellulosic biomass material, for example, black liquor having an initial pH level and an initial temperature, in embodiments between 50-85 degrees, is fed 31 to a first precipitation phase 33. The first precipitation phase is preferably performed during a time duration of at least 10 seconds, and preferably during 10-80 seconds, and preferably during 10-30 seconds. In embodiments, the first acidifier is added using injection nozzles or valves 24 to achieve a high pressure in the first precipitation phase, for example, a pressure more than 2, or 3, 4 or 5 bars. The first acidifier is preferably an acidifying gas such as $CO_2$. In the first precipitation phase, a decrease in the pH value of the black liquor from the initial pH level to a first pH level is created. For example, the pH of the black liquor is around 13 or 13.5 and the pH is lowered to around 11-12 in the first precipitation phase. In embodiments of the present invention, at least 10% of the original lignin content is precipitated as nucleus particles in the first precipitation phase.

Thereafter, the acidic slurry is fed, for example, via pump 34 from the first precipitation phase 33 to a second precipitation phase 35. A second acidifier, preferably an acidifying gas such as $CO_2$, is added, and in embodiments this is performed continuously or intermittently at intervals using for example a sparger or impeller 36. A decrease in the first pH value from the first pH level to a second pH level is thereby obtained and the second pH may be around 10.

In embodiments of the present invention, the second precipitation phase 35 is performed during a time duration of at least 20 minutes, and preferably during a time duration of 20-60 minutes, and preferably during a time duration of 30-50 minutes, and more preferably during a time duration of 35-45 minutes. The second precipitation phase 35 may be performed at atmospheric pressure. Alternatively, the second precipitation phase 35 may be performed at a high pressure, for example, a pressure more than 2, or 3, 4 or 5 bars. Thereafter, the processed black liquor slurry is fed using, for example, a pump 37 to a filtering stage 38.

Figure 4:
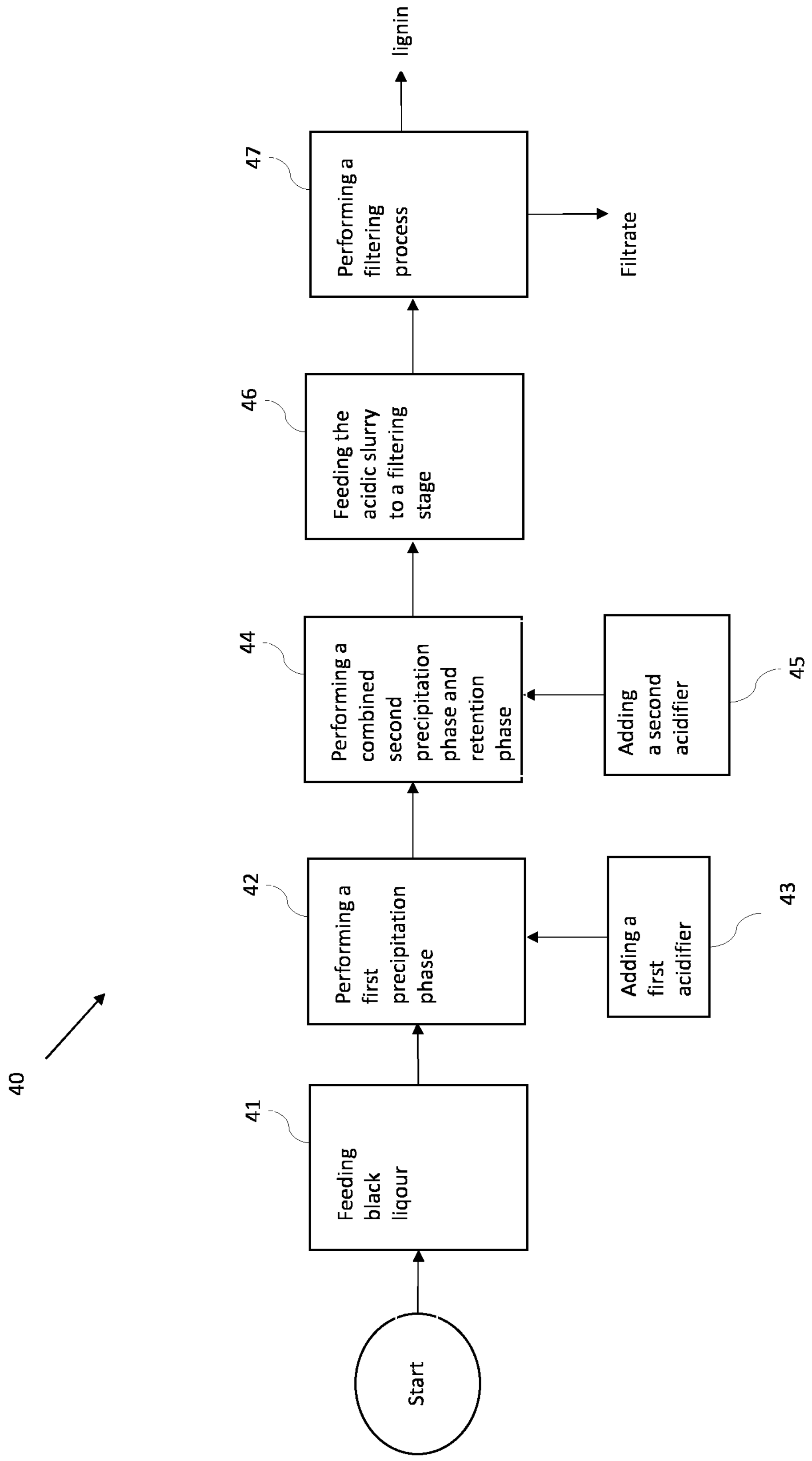
FIG. 4 is a flow chart illustrating general steps of a method in accordance with the present invention.

Turning now to FIG. 4, the method according to the present invention will be discussed with reference to a flow chart illustrating general steps of the method. In a first general embodiment of the present invention, the method 40 comprises the step of feeding 41 an aqueous slurry containing lignocellulosic biomass material, for example black liquor, having an initial pH level and an initial temperature. In certain embodiments, black liquor having a temperature of between 50-85 degrees is fed 41 to a first precipitation phase 42.

In step 42, the first precipitation phase is preferably performed during a reaction time of at least 10 seconds, and preferably during 10-80 seconds, and preferably during 10-30 seconds. In embodiments of the present invention, a pre-step or pre-process is performed before or up-stream the first precipitation phase, where the received black liquor is precipitated to achieve a first and moderate decrease in pH level and a small amount of the original lignin content is precipitated as nucleus particles, for example, a few percentage, such as below 5% or below 10%.

In the first precipitation phase, a first acidifier is added 43 using injection nozzles or valves to achieve a high pressure in the first precipitation phase, for example, a pressure more than 5 bars. In other embodiments, the first precipitation phase may be performed at a pressure below 5 bars including at atmospheric pressure. The first acidifier is preferably an acidifying gas such as $CO_2$. In the first precipitation phase, a decrease in the pH value of the black liquor from the initial pH level to a first pH level is created. For example, the pH of the black liquor is around 13 or 13.5 and the pH is lowered to around 11-12 in the first precipitation phase. In embodiments of the present invention, at least 10% of the original lignin content is precipitated as nucleus particles.

Thereafter, the processed black liquor is fed to a second precipitation phase 35 (referring to FIG. 3), where a combined second precipitation and retention phase is performed 44. A second acidifier, preferably an acidifying gas such as $CO_2$ is continuously added 45. A decrease in the first pH value from the first PH level to a second pH level is thereby obtained and the second pH may be between 9-11, for example around 10. In embodiments, the combined second precipitation and retention phase 35 is performed 44 during a reaction time of at least 20 minutes, and preferably during a reaction time of 20-60 minutes, and preferably during a time duration of 30-50 minutes, and more preferably during a reaction time of 35-45 minutes. The combined precipitation and retention phase 35 may be performed 44 at atmospheric pressure. Alternatively, the second precipitation phase 35 may be performed at a high pressure, for example, a pressure more than 2, or 3, 4 or 5 bars. Thereafter, the processed black liquor slurry is fed 46 to a filtering stage 38, where a filtering process is performed 47. However, according to embodiments of the present invention, one or more additional precipitation phases are arranged or provided after the second precipitation phase in order to achieve a precipitation of an even higher amount of the original lignin content as nucleus particles.

Figure 5:
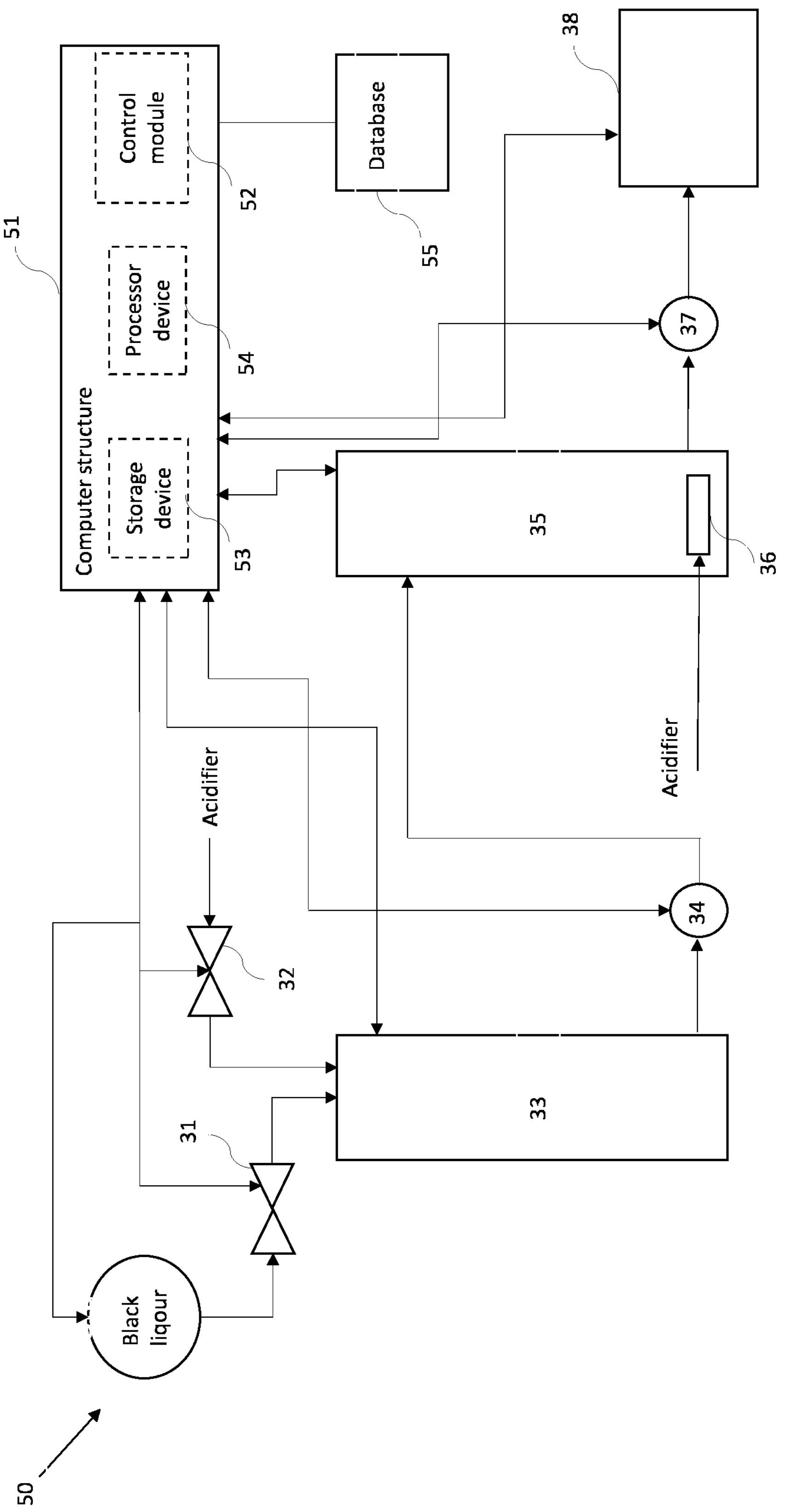
FIG. 5 schematically shows a lignin separation process in accordance with embodiments of the present invention.

Turning now to FIG. 5, a computer structure or software 51 in which the method according to the present invention may be implemented will be described. The computer structure or software 51 may be included in a lignin separation system 50 as shown in FIG. 5. As shown in FIG. 5, a lignin separation system 50 may include a control console or control module 52, and a database 53. The control module 52 may include hardware and software components to control equipment of the lignin separation system 50, such as first and second precipitation phases 33 and 35, feeding devices for black liquor and acidifiers 31 and 36, respectively, and feeding devices for processed lignin 34 and 37 and filtering devices 38. In order to execute control instructions and operations and acquire information data from the various devices, units and equipment of the system, sensors for pressure, temperature, etc. are arranged and in connection with the control module 52. The hardware components of computer structure 51 may include one or more computers (e.g., general purpose computers, workstations, servers, terminals, portable/mobile devices, etc.); processor devices (e.g., central processing units (CPUs), graphics processing units (GPUs), microprocessors, digital signal processors (DSPs), field programmable gate arrays (FPGAs), special-purpose or specially-designed processors, etc.); memory/storage devices (e.g., read-only memories (ROMs), random access memories (RAMs), flash memories, hard drives, optical disks, solid-state drives (SSDs), etc.); input devices (e.g., keyboards, mice, touch screens, mics, buttons, knobs, trackballs, levers, handles, joysticks, etc.); output devices (e.g., displays, printers, speakers, vibration devices, etc.); or other suitable hardware. The software components of computer structure 51 may include operation system software, application software, etc. and may include computer readable and executable codes or instructions for performing the processes described in detail in this application. For example, the control module 52, and a processor device 54 may be communicatively connected to a memory/storage device 53 to access and execute the codes or instructions. The execution of the codes or instructions may cause the processor device 54 to perform operations to achieve one or more functions consistent with the disclosed embodiments. The computer structure 51 may be configured to execute the methods described herein, for example, the methods described with reference to FIG. 4.

As indicated above, computer structure 51 may be communicatively connected to a database 55 to access data. In some embodiments, database 55 may be implemented using local hardware devices, such as one or more hard drives, optical disks, and/or servers that are in the proximity of computer structure 51. In some embodiments, database 55 may be implemented in a data center or a server located remotely with respect to computer structure 51. Computer structure 51 may access data stored in database 55 through wired or wireless communication. Further, database 55 may include machine data. Machine data may include information associated with devices, units, and equipment of lignin separation system 50, or other machines relevant to the separation system, and the like.

EXAMPLES

During trials it has been shown that multiple precipitation phases can be of interest and significantly improve the filtration properties of the precipitated black liquor. The invention use injection of CO2 gas but the precipitation will be stopped at a higher pH level compared to systems of today. The pH level in this first precipitation phase will be stopped at approximately pH 11.5 and precipitation takes place during high pressure utilizing injection nozzles, >5 bar, the precipitation phase being approx 10 to 30 seconds. After the first precipitation phase, the pressure is released, and the precipitated slurry is led to a second precipitation vessel where a prolonged precipitation phase is carried out. In trials the duration of this phase was 40 minutes and CO2 gas is introduced using a sparger in the tank (tank equipped with impeller) and the pH level goes from 11 to approximately 10. More than 10% of the total lignin will be precipitated in the first precipitation phase, and in some cases more than 20% of the total black liquor is precipitated at a pH level of 11.5 for a black liquor with a DS of 33% (Na content of 63.5 g/kg) and even more for a black liquor with higher DS/increased Na content/increased ionic strength. During the trials where the new invention was tested and evaluated a SW black liquor with an initial DS of 38.6% was used. It was seen that the filtration resistance was 11 to 16 times lower. This corresponds to a filtration time that potentially would be 3.3 to 4 times faster. For example: a filtration time in the above case using a prior art system, for example, the system described in FIG. 1, could be 480 sec, total cycle time, or ~20 min. As a comparison, the new invention could have a filtration time of 140 sec (corresponds to 3.4 faster filtration), total cycle time ~16 min). This would lead to an increased capacity of a pressure filter of same size for both cases with approx 43%.

Various method steps, operations or functions are described herein, which may be implemented or defined as software code or instructions. Such content may be directly executable ("object" or "executable" form), source code, or difference code ("delta" or "patch" code). Software implementations of the embodiments described herein may be provided via an article of manufacture with the code or instructions stored thereon, or via a method of operating a communication interface to send data via the communication interface. A machine or computer readable storage medium may cause a machine to perform the functions or operations described and includes any mechanism that stores information in a form accessible by a machine (e.g., computing device, electronic system, and the like), such as recordable/non-recordable media (e.g., read only memory (ROM), random access memory (RAM), magnetic disk storage media, optical storage media, flash memory devices, and the like). A communication interface includes any mechanism that interfaces to any of a hardwired, wireless, optical, and the like, medium to communicate to another device, such as a memory bus interface, a processor bus interface, an Internet connection, a disk controller, and the like. The communication interface can be configured by providing configuration parameters and/or sending signals to prepare the communication interface to provide a data signal describing the software content. The communication interface can be accessed via one or more commands or signals sent to the communication interface.

The present disclosure also relates to a system for performing the operations herein. This system may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CDROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The order of execution or performance of the operations in embodiments of the present disclosure illustrated and described herein is not essential, unless otherwise specified. That is, the operations may be performed in any order, unless otherwise specified, and embodiments of the present disclosure may include additional or fewer operations than those disclosed herein. For example, it is contemplated that executing or performing a particular operation before, contemporaneously with, or after another operation is within the scope of aspects of the present disclosure.

Embodiments of the present disclosure may be implemented with computer-executable instructions. The computer-executable instructions may be organized into one or more computer-executable components or modules. Aspects of the present disclosure may be implemented with any number and organization of such components or modules. For example, aspects of the present disclosure are not limited to the specific computer-executable instructions or the specific components or modules illustrated in the figures and described herein. Other embodiments of the present disclosure may include different computer-executable instructions or components having more or less functionality than illustrated and described herein.

When introducing elements of aspects of the present disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the present disclosure in detail, it will be apparent that modifications and variations are possible without departing from the scope of aspects of the present disclosure as defined in the appended claims. As various changes could be made in the above constructions, products, and methods without departing from the scope of aspects of the present disclosure, it is intended that all matter contained in the above description and shown in the accompanying drawings shall be interpreted as illustrative and not in a limiting sense.

The invention claimed is:

1. A method for separation of lignin from an aqueous slurry containing lignocellulosic biomass material comprising:

providing the aqueous slurry containing lignocellulosic biomass material and having an initial pH level to a first precipitation vessel;

performing a first precipitation phase in the first precipitation vessel during a first time duration, said first precipitation phase including adding a first acidifier, wherein a first decrease in a pH value of the aqueous slurry from said initial pH level to a first pH level is created, wherein the first pH level is above 11;

feeding processed aqueous slurry directly from the first precipitation vessel to a second precipitation vessel; and performing a second precipitation phase in the second precipitation vessel, said second precipitation phase including continuously or intermittently adding a second acidifier, wherein the second precipitation phase is performed for at least 20 minutes following a start of the addition of the second acidifier, and wherein a second decrease in the pH value from said first pH level to a second pH level is created, wherein said second pH level is above 9.

2. The method according to claim 1, further comprising performing the second precipitation phase during a time duration of 20-60 minutes.

3. The method according to claim 1, wherein the first precipitation phase is performed during a time duration of at least 10 seconds.

4. The method according to claim 1, wherein at least 10% of original lignin content is precipitated as nucleus particles in said first precipitation phase.

5. The method according to claim 1, wherein at least 15% of original lignin content is precipitated as nucleus particles in said first precipitation phase.

6. The method according to claim 1, wherein at least 20% of original lignin content is precipitated as nucleus particles in said first precipitation phase.

7. The method according to claim 1, wherein the second pH level is above 10.

8. The method according to claim 1, wherein the first pH level is between 11-12 and/or the second pH level is between 9-11.

9. The method according to claim 1, further comprising continuously adding the second acidifier during stirring of the processed aqueous slurry.

10. The method according to claim 1, wherein at least one of the first acidifier or the second acidifier comprises acidifying gas.

11. The method according to claim 1, further comprising at least one further precipitation phase, including adding a third acidifier, down-stream the second precipitation phase.

12. The method according to claim 1, wherein the first pH level is between 11-12 and the second pH level is between 9-11.

13. A system for separation of lignin from an aqueous slurry containing lignocellulosic biomass material comprising:

a first precipitation vessel configured to:

receive said aqueous slurry having an initial pH level, and perform a first precipitation phase during a predetermined first time duration;

at least one first injector configured to add a first acidifier to the first precipitation vessel;

a second precipitation vessel configured to:

receive processed aqueous slurry directly from the first precipitation vessel without the processed aqueous slurry passing through a storage vessel, and perform a second precipitation phase; and at least one second injector configured to add a second acidifier to the second precipitation vessel; and a processor configured to:

control the first injector to add the first acidifier to the first precipitation vessel, and control the first precipitation phase such that a first decrease in a pH value of the aqueous slurry from said initial pH level to a first pH level above 11 is created in the first precipitation vessel, and control the second injector to continuously or intermittently add the second acidifier to the second precipitation vessel, and control the second precipitation phase such that the second precipitation phase is performed for at least 20 minutes following a start of the addition of the second acidifier and such that a second decrease in the pH value from said first pH level to a second pH level above 9 is created in the second precipitation vessel.

14. The system accordingly to claim 13, wherein the at least one first injector comprises a plurality of injection nozzles configured to inject the first acidifier at a pressure higher than 5 bar.

15. The system accordingly to claim 13, wherein the at least one second injector comprises a sparger configured to inject the first acidifier.

16. The system according to claim 13, wherein the first pH level is between 11-12 and the second pH level is between 9-11.

* * * * *